United States Patent
Holbrook et al.

[11] Patent Number: 6,024,668
[45] Date of Patent: Feb. 15, 2000

[54] EXTREME COLD LOGIC LIMITING SHIFTS TO FIRST AND THIRD SPEEDS

[75] Inventors: Gerald L. Holbrook, Rochester Hills; Hussein A. Dourra, Dearborn Heights; Mark A. Danielson, Lake Orion, all of Mich.

[73] Assignee: Daimlerchrysler Corporation, Auburn Hills, Mich.

[21] Appl. No.: 09/283,454

[22] Filed: Apr. 1, 1999

[51] Int. Cl.$^7$ ................................................. F16H 59/78
[52] U.S. Cl. ........................................... 477/98; 477/76
[58] Field of Search ................................ 477/97, 98, 76

[56] References Cited

U.S. PATENT DOCUMENTS

| | | |
|---|---|---|
| 4,527,448 | 7/1985 | Person et al. . |
| 4,531,432 | 7/1985 | Inagaki et al. ............................ 477/98 |
| 4,875,391 | 10/1989 | Leising et al. . |
| 5,016,176 | 5/1991 | Holbrook et al. . |
| 5,024,125 | 6/1991 | Baba ......................................... 477/98 |
| 5,058,014 | 10/1991 | Saitou et al. .............................. 477/98 |
| 5,115,694 | 5/1992 | Sasaki et al. ......................... 477/98 X |
| 5,216,606 | 6/1993 | Lentz et al. . |
| 5,261,295 | 11/1993 | Iwanaga et al. ........................... 477/98 |
| 5,319,963 | 6/1994 | Benford . |
| 5,329,830 | 7/1994 | Kitagawa et al. ....................... 477/117 |
| 5,456,647 | 10/1995 | Holbrook . |
| 5,468,198 | 11/1995 | Holbrook et al. . |
| 5,676,619 | 10/1997 | Ohashi et al. ............................ 477/98 |
| 5,801,621 | 9/1998 | Issa et al. . |
| 5,941,796 | 8/1999 | Lee ......................................... 477/158 |

*Primary Examiner*—Khoi Q. Ta
*Attorney, Agent, or Firm*—Marc Lorelli

[57] ABSTRACT

An automatic transmission control system is provided with extreme cold logic wherein when the transmission oil temperature is below a predetermined temperature so as to cause the transmission oil to have extremely viscus characteristics, the transmission prevents faulty shifting by limiting shifts between first and third gears. The first gear is obtained by application of a single hydraulically controlled clutch element in combination with a freewheel clutch element while the third gear operation can be obtained by engagement of a second clutch element in combination with the first clutch element. Since the shift between first and third gears only requires the application of the second clutch element in combination with the already engaged first clutch element, there is no risk of torque overlap between elements.

1 Claim, 8 Drawing Sheets

FIG 2A

| -RWD 4-SPEED ELECTRONIC TRANSMISSION | MANUAL VALVE POSITION | GEAR | TORQUE RATIO | CLUTCHES APPLIED |
|---|---|---|---|---|
| UD - UNDERDRIVE CLUTCH<br>OD - OVERDRIVE CLUTCH<br>R - REVERSE CLUTCH<br>4C - 4TH. CLUTCH<br>2C - 2ND. CLUTCH<br>LR - LOW-REVERSE CLUTCH<br>FW - FREE WHEEL<br>CC - CONVERTER CLUTCH | | REV.<br>PARK. NEU.<br>1ST.<br>2ND.<br>2'<br>DIRECT<br>4TH.<br>4' | 3.00<br><br>3.00<br>1.67<br>1.50<br>1.00<br>0.75<br>0.67 | RC. LR<br>LR<br>UD. FW.(LR)<br>UD. 2C<br>UD. 4C<br>UD. OD<br>OD. 4C<br>OD. 2C |

C=CARRIER ASSEMBLY  A=ANNULUS GEAR  S=SUN GEAR  CC=CONVERTER CLUTCH  FW=FREE WHEEL CLUTCH

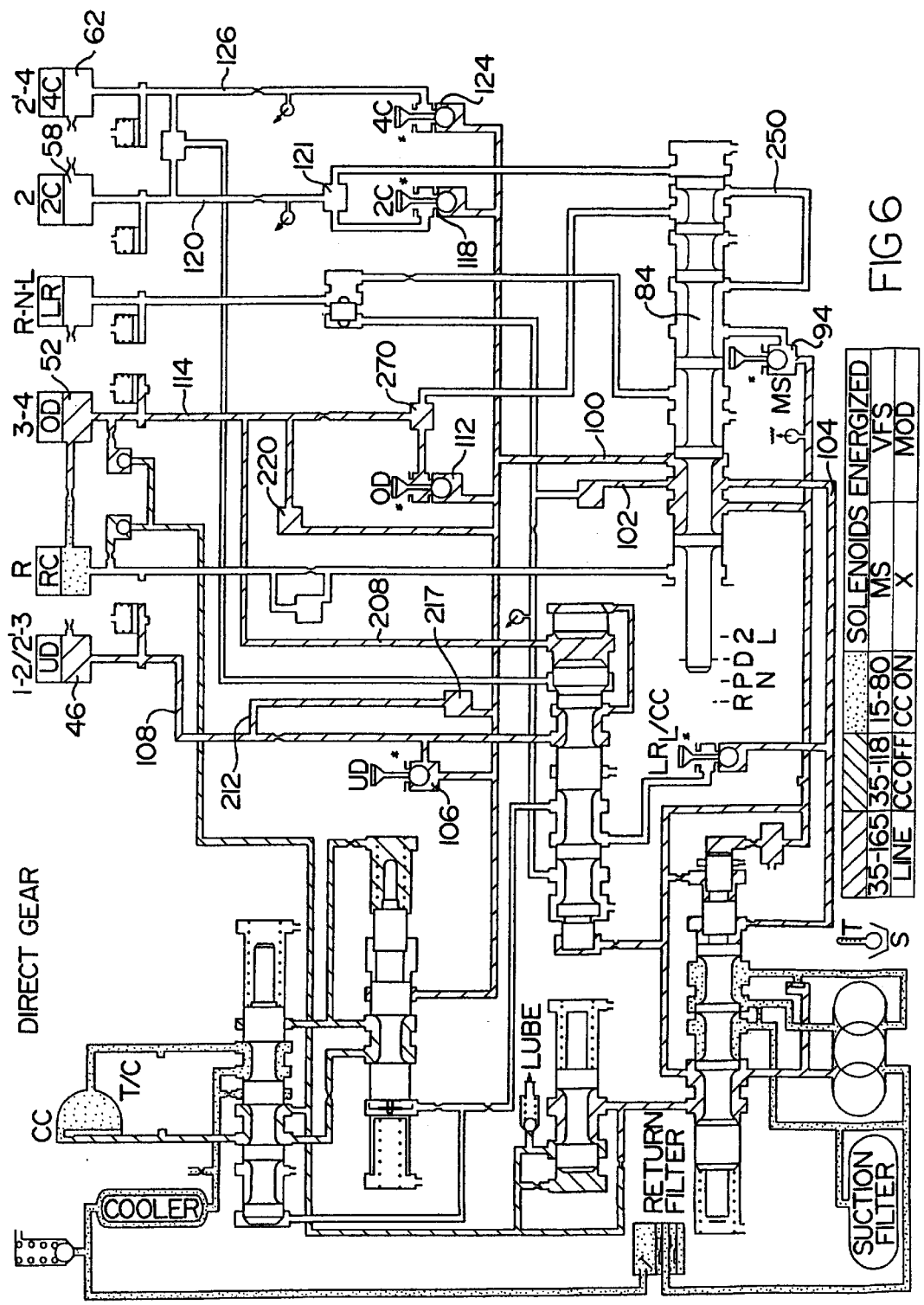

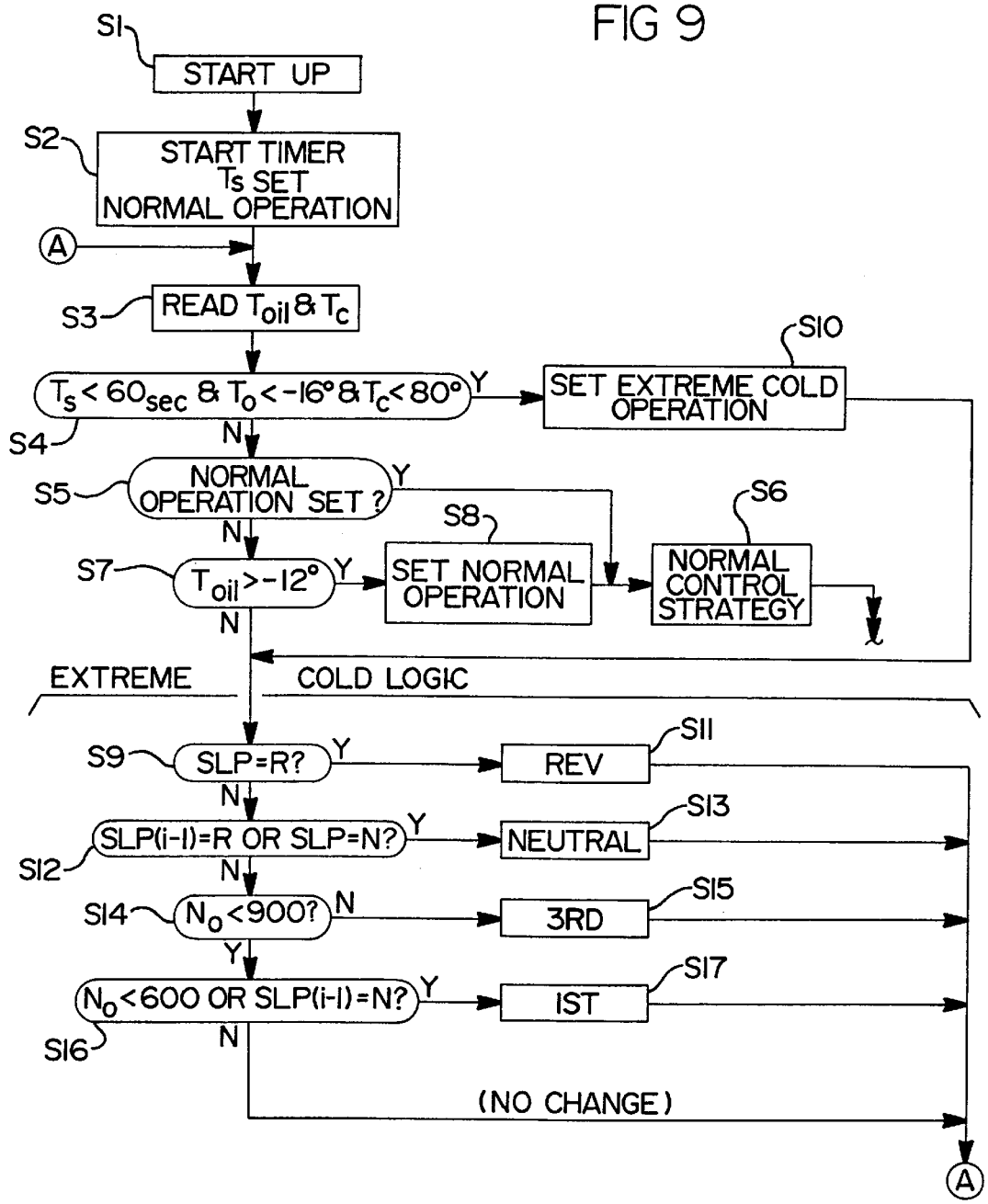

EXTREME COLD LOGIC LIMITING SHIFTS TO FIRST AND THIRD SPEEDS

BACKGROUND OF THE INVENTION

1. Field of the Invention

The present invention relates generally to automatic transmissions, and more particularly to a transmission control system with extreme cold logic.

2. Background and Summary of the Invention

Conventional automatic transmissions include a hydrodynamic torque converter to transfer engine torque from the engine crankshaft to a rotatable input member of the transmission through fluid flow forces. The transmission includes frictional units which couple the rotating input member to one or more members of a planetary gear set. Other frictional units hold members of the planetary gear set stationary during flow of power. The drive clutch assemblies can couple the rotating input member of the transmission to the desired elements of the planetary gear sets, while the brakes hold elements of these gear sets stationary. Such transmission systems also typically provide for one or more planetary gear sets in order to provide various ratios of torque and to ensure that the available torque and the respective reactive power demand are matched to each other.

Automatic transmissions are typically provided with a hydraulic control system and associated electronic controller which take automatic control of the friction units, gear ratio selecting, and gear shifting. The hydraulic control system includes various fluid passages connected between valves which are controllable for applying and releasing the clutch elements in order to shift the gears of the transmission based upon the controls provided by the electronic controller. The electronic controller typically chooses the proper gear dependant upon a shift program selection, accelerator position, engine condition, and vehicle speed. The hydraulic control system uses several valves to direct and regulate the supply of hydraulic pressure to the clutch elements. The hydraulic pressure control causes either the actuation or de-actuation of the respective frictional clutch units for effecting gear changes in the transmission. The valves used in the hydraulic control circuit typically comprise spring-biased spool valves, spring-biased accumulators and ball check valves. Since many of the valves rely upon springs to provide a predetermined amount of force, it will be appreciated that each transmission design represents a finely tuned arrangement of interdependent valve components.

With the automatic transmission assembly relying upon hydraulic fluid for actuation or deactuation of the respective frictional clutch units for effecting gear changes in the transmission, the viscosity of the hydraulic fluid is an important factor in providing sufficient control of the frictional clutch units. In particular, under extreme cold temperatures, the hydraulic fluid can take on a viscosity similar to molasses. Specifically, below approximately –16° F., the viscosity of the hydraulic fluid prevents adequate real-time closed loop control of pressure to the clutch elements with electronic controls. Accordingly, it is an object of the present invention to provide an automatic transmission with a control system which includes an extreme cold logical shift strategy which provides a relatively high gear ratio launch and a limited shift to a lower gear ratio which requires the application of a single clutch member with no risk of torque overlap between elements.

According to this aspect of the present invention, a hydraulic control system is provided for an automatic transmission including a planetary gear system having a clutch element engagable to provide a first relatively high torque ratio and a second clutch element engagable along with the first clutch element in order to provide a second relatively lower gear ratio. The control system includes an extreme cold shift logic strategy which senses when the transmission fluid is below a predetermined temperature and institutes an extreme cold shift logic wherein transmission shifting in forward gears is limited to a first and a second gear ratio.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 2A is a table illustrating the applied clutches for each gear ratio of the transmission according to the principles of the present invention;

FIG. 6 is a schematic view of the hydraulic control system in the direct gear mode;

FIG. 9 is a flowchart of the extreme cold logic strategy according to the principles of the present invention.

DETAILED DESCRIPTION OF THE PREFERRED EMBODIMENTS

Figure 2:
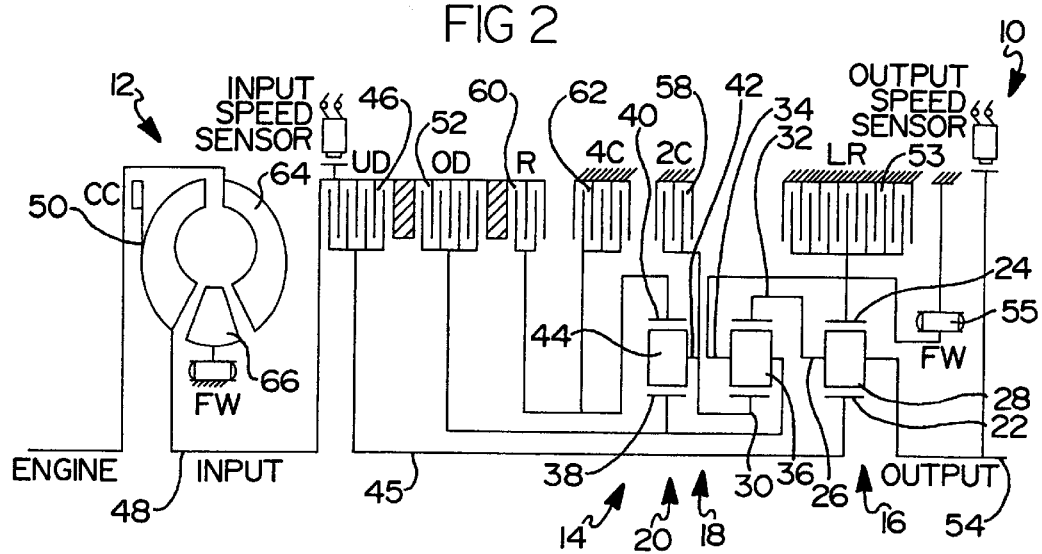
FIG. 2 is a schematic diagram of the transmission gear train according to the principles of the present invention.

With reference to FIG. 2, a rear wheel drive four-speed automatic transmission 10 is shown, according to the principles of the present invention. The automatic transmission 10 includes a torque converter 12 which is operably connected to a multiple planetary gear system 14. The multiple planetary gear system 14 includes a first planetary gear assembly 16, a second planetary gear assembly 18, and a third planetary gear assembly 20. The first planetary gear assembly 16 includes a sun gear 22, an annulus gear 24, a planetary carrier assembly 26, and a plurality of planetary gears 28 rotatably mounted to the planetary carrier 26. The second planetary gear assembly 18 includes a sun gear 30, an annulus gear 32, a planetary carrier 34, and a plurality of planetary gears 36 rotatably mounted on the planetary carrier 34. The third planetary gear assembly 20 includes a sun gear 38, an annulus gear 40, a planetary carrier 42, and a plurality of planetary gears 44 rotatably mounted on the planetary carrier 42.

The sun gear 22 of the first planetary gear assembly 16 is selectively driven by engagement of an underdrive clutch 46 with an input shaft 48 which is driven by a turbine 50 of the torque converter 12. The annulus gear 24 of the first planetary gear assembly 16 is attached to the planetary carrier 34 of the second planetary gear assembly 18 which is also attached to the sun gear 38 of the third planetary gear assembly 20. Each of these elements are selectively engaged by an overdrive clutch 52 which engages the annulus gear 24 of first planetary gear assembly 16, the carrier assembly 34 of the second planetary gear assembly 18, and the sun gear 38 of the third planetary gear assembly to the input shaft 48. The planetary carrier 26 of the first planetary gear assembly 16 is attached to an output shaft 54 and is also attached to the annulus gear 32 of the second planetary gear assembly 18. The sun gear 30 of the second planetary gear assembly 18 is attached to the planetary carrier 42 of the third planetary gear assembly 20 which is engagable by a second gear clutch 58 which is engagable to prevent rotation of the carrier 42 and sun gear 30 relative to the transmission housing. The annulus gear 40 of the third planetary gear assembly 20 is engagable by a reverse clutch 60 for selectively engaging the annulus gear 40 with the input shaft 48. In addition, the annulus gear 40 of the third planetary gear assembly 20 is also engagable with a fourth gear clutch 62 for preventing rotation of the annulus gear 40 relative to the transmission housing.

The torque converter 12 includes an impeller 64 which is attached to the engine (not shown). As the engine drives the impeller 64, fluid which is propelled by the blades of the impeller 64 drive the turbine 50 in order to drive the input shaft 48. The stator 66 directs the fluid from the turbine 50 back to the impeller 64 in order to achieve torque multiplication, as is well known in the art.

FIG. 2A illustrates the different operating modes of the automatic transmission, as shown in FIG. 2. In particular, in order to obtain a reverse gear operation, the reverse clutch 60 and low/reverse clutch 53 must be applied. In order to provide improved neutral-to-reverse shift quality, the low/reverse clutch 53 is applied in neutral. In order to obtain first gear, the underdrive clutch 46 and the free wheel clutch 55 or the low/reverse clutch 53 must be applied. In order to obtain second gear, the underdrive clutch 46 and second gear clutch 58 must be applied. In order to obtain a second prime ($2^{nd'}$) gear, the underdrive clutch 46 and fourth gear clutch 62 must be applied. In order to obtain the direct gear ($3^{rd}$), the underdrive clutch 46 and overdrive clutch 52 must be applied. In order to obtain fourth gear, the underdrive clutch 52 and fourth gear clutch 62 must be applied. In order to obtain a fourth prime gear ($4^{th'}$), the underdrive clutch 52 and second gear clutch 58 must be applied.

Figure 1:
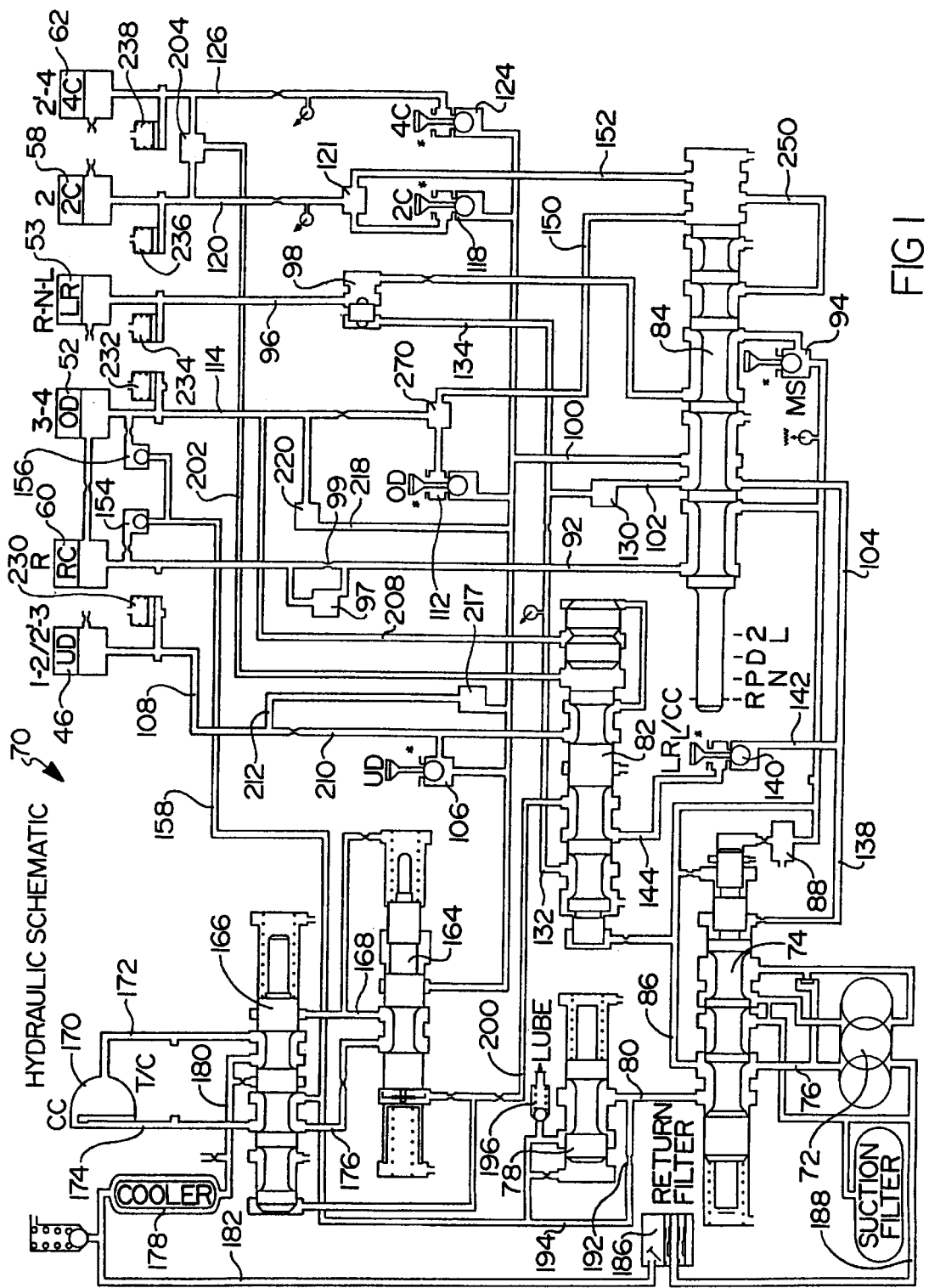
FIG. 1 is a schematic view of the hydraulic control system of the automatic transmission according to the principles of the present invention.

With reference to FIG. 1, the hydraulic control system 70, for selectively engaging the underdrive clutch 46, overdrive clutch 52, low/reverse clutch 53, second gear clutch 58, fourth gear clutch 62, and reverse gear clutch 60, will now be described. The hydraulic control system 70 includes a pump 72 which supplies hydraulic fluid to a regulator valve 74 via passage 76. The regulator valve 74 distributes hydraulic fluid under pressure to the torque converter limit valve 78 via fluid passage 80 as well as to the end of the solenoid switch valve 82 and to the manual valve 84 via passage 86. A variable force solenoid 88 is disposed between the hydraulic passage 86 and the end chamber of the regulator valve 74.

Figure 8:
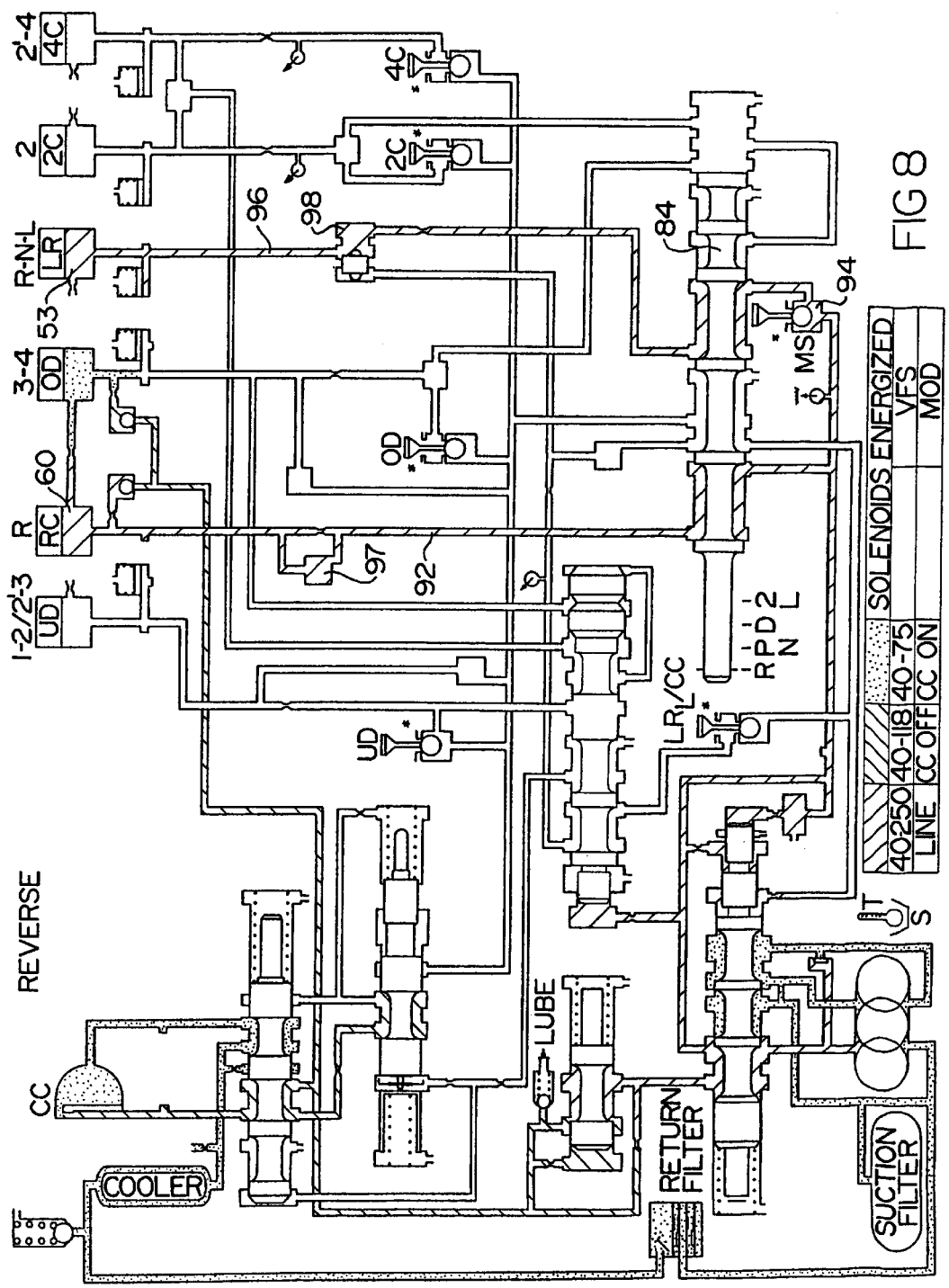
FIG. 8 is a schematic diagram of the hydraulic control system in the reverse mode.

In the reverse "R" position of the manual valve 84 (as shown in FIG. 8), hydraulic fluid is communicated to the reverse clutch 60 via passage 92 and to the low/reverse clutch 53, when the multi-select solenoid 94 is de-energized, via passage 96. A ball check valve 97 is provided in bypass relationship to a restriction 99 in passage 92. A low/reverse switch valve 98 is provided in the passage 96. In order to block a transmission shift to the reverse gear, the transmission controller, in response to a detected vehicle speed which exceeds a predetermined value (for example, 8 mph), holds the multi-select solenoid 94 in the activated condition so that the low/reverse clutch 53 cannot be actuated.

When the manual valve 84 is in the drive "D" position, hydraulic fluid is delivered to the passages 100, 102, and 104, as shown in FIG. 6. Upon deactivation of the underdrive clutch solenoid 106, hydraulic fluid can be delivered to the underdrive clutch 46 from passage 100 via passage 108. By activation of the overdrive clutch solenoid 112, hydraulic fluid can be delivered to overdrive clutch 52 via passage 114. Through actuation of second gear clutch solenoid 118, hydraulic fluid can be delivered to the second gear clutch 58 from passage 100 via passage 120 through dual acting ball check valve 121. By actuating fourth gear clutch solenoid 124, hydraulic fluid can be delivered to the fourth gear clutch 62 from passage 100 via passage 126.

Ball check valve 130 allows flow from passage 134 to passage 102. Passage 132 communicates with solenoid switch valve 82 and passage 134. Passage 104 delivers hydraulic fluid to the regulator valve 74 via passage 138 and to a low/reverse torque converter clutch solenoid valve 140 via passage 142. When in the energized position, the low/reverse torque converter clutch solenoid valve 140 delivers hydraulic fluid to the solenoid switch valve 82 via passage 144 providing that the manual valve 84 is not in the reverse position. Hydraulic fluid can additionally be delivered to the overdrive clutch 52 via passage 150 which communicates with the manual valve 84. Hydraulic fluid can also be communicated to the second gear clutch 58 via passage 152 which communicates with the manual valve 84.

The reverse clutch 60 and overdrive clutch 52 are each provided with dribbler valves 154, 156, respectively which allow a slow flow of hydraulic fluid into the reverse clutch 60 and overdrive clutch 52, respectively, to help keep air purged from the clutches when they are not pressurized.

Pressurized fluid is delivered to the torque converter control valve 164 via passage 100. The torque converter control valve 164 communicates pressurized fluid to the torque converter switch valve 166 via hydraulic passage 168. The torque converter switch valve 166 communicates pressurized fluid to the torque converter clutch 170 via passage 172. Hydraulic fluid is also communicated between the back side of the torque converter clutch 170 and the torque converter switch valve 166 via passage 174.

Hydraulic fluid is communicated between the torque converter control valve 164 and the torque converter switch valve 166 via passage 176. Hydraulic fluid is communicated between the torque converter switch valve 166 and a cooler device 178 via passage 180. The hydraulic fluid from the cooler 178 is communicated via passage 182 to a return filter 186 which communicates hydraulic fluid through passage 188 to the pump 72. Hydraulic fluid is communicated at a reduced pressure from line 80 through restriction 192 to passage 194 which communicates with the torque converter switch valve 166 and to an input shaft lube valve 196. Pressurized fluid is communicated between the solenoid switch valve 82, the torque converter control valve 164, and the torque converter switch valve 166 via passage 200.

Hydraulic fluid is communicated between the solenoid switch valve 82, the second gear clutch 58, and fourth gear clutch 62 via passage 202 which communicates with the three-way ball check valve 204. Hydraulic fluid is communicated between the solenoid switch valve 82 and the overdrive clutch 52 via passage 208 which communicates with passage 114. Hydraulic fluid is communicated between the solenoid switch valve 82 and the underdrive clutch 46 via passage 210 which communicates with passage 108. A bypass line 212 is provided between fluid passage 100 and fluid passage 108 which communicates with the underdrive clutch 46 through ball check 217. A bypass line 218 is provided between fluid line 100 and fluid passage 114 which communicates with overdrive clutch 52 through ball check 220.

The fluid passage 108 which communicates with the underdrive clutch 46 is provided with an accumulator 230. The passage 114 which communicates with the overdrive clutch 52 is provided with accumulator 232. The passage 96 which communicates with the low/reverse clutch 53 is provided with an accumulator 234. The passage 120 which communicates with the second gear clutch 58 is provided with an accumulator 236, and the passage 126 which communicates with the fourth gear clutch 62 is provided with an accumulator 238.

Figure 3:
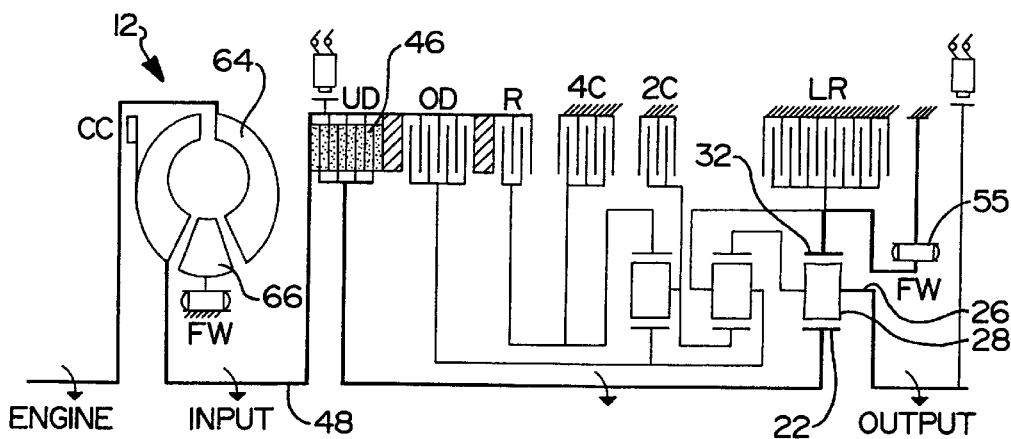
FIG. 3 is a schematic diagram of the automatic transmission of the present invention illustrating the torque flow for first gear of the transmission.

With reference to FIG. 3, a schematic diagram of the automatic transmission 10 is shown illustrating the torque path for the transmission when operated in first gear. In the first gear operating mode, the underdrive clutch 46 and freewheel clutch 55 are each engaged. Accordingly, the engine drives the impeller 64 which in turn drives the turbine 50 of the torque converter 12. The turbine 50 drives the input shaft 48 which in turn drives the sun gear 22 of the first planetary gear assembly 16 via underdrive clutch 46 being engaged to drive shaft 45. As the sun gear 22 rotates, planetary gears 28, which are supported on planetary carrier 26, are rotated. The annulus gear 32 is prevented from rotating by the freewheel clutch 55. The planetary carrier 26 is caused to rotate as the planetary gears 28 are driven by the sun gear 22 and revolve around the sun gear 22 due to the annulus gear 32 being fixed. Thus, the output shaft 54 which is attached to the planetary carrier 26 is driven at a 3.0 torque ratio relative to the input shaft 48.

Figure 4:
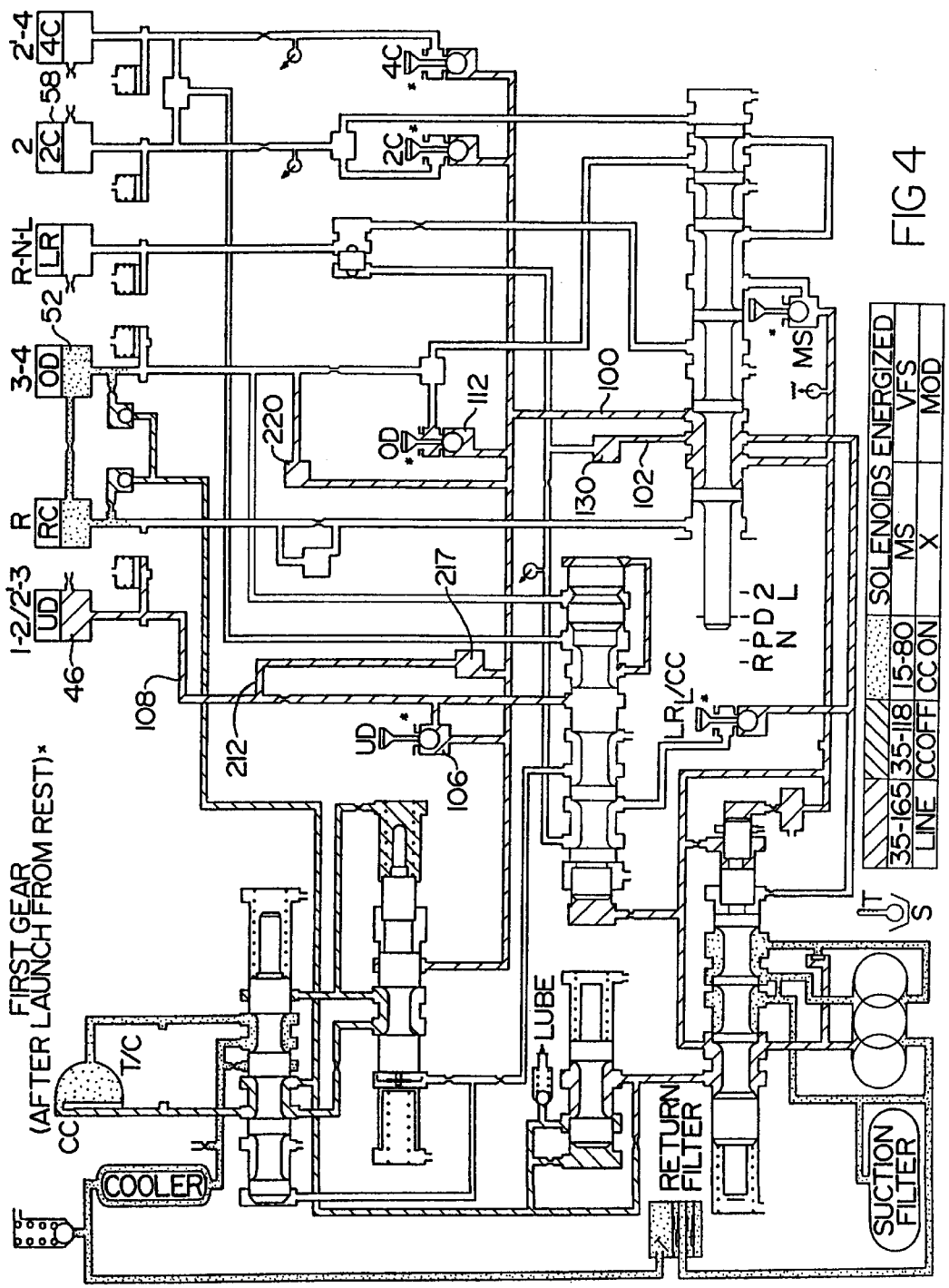
FIG. 4 is a schematic diagram of the hydraulic control system illustrating the hydraulic control system in first gear.

With reference to FIG. 4, the hydraulic control system is shown for operation in first gear. In particular, the manual valve 84 is in the "D" position and the multi-select solenoid 94 is energized and the underdrive clutch solenoid 106 is de-energized in its normally open position so that hydraulic fluid is delivered through passage 100 and communicated to passage 108 for actuating underdrive clutch 46.

Figure 5:
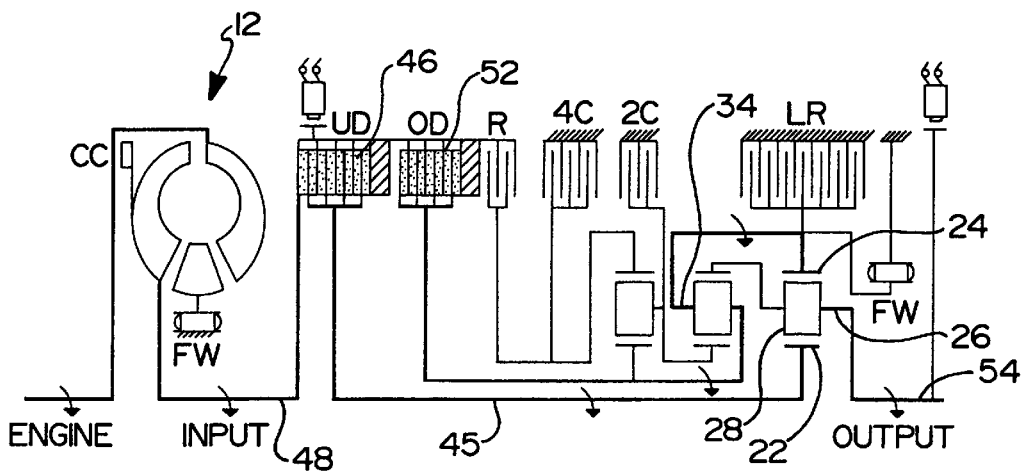
FIG. 5 is a schematic view of the automatic transmission gear train illustrating the torque flow path for direct drive.

With reference to FIG. 5, the automatic transmission gear train is shown in the direct gear mode of operation. In direct gear the underdrive clutch 46 is engaged for providing driving torque to the shaft 45 which in turn drives the sun gear 22 of the first planetary gear assembly 16. The overdrive clutch 52 is also engaged and provides torque to the planetary carrier 34 of the second planetary gear assembly 18 as well as the annulus gear 24 of the first planetary gear assembly 16. In this mode of operation, the output shaft 54 is driven at a 1.0 torque ratio to the input shaft 48. In other words, as the annulus gear 24 and sun gear 22 of the first planetary gear assembly 16 rotate at the same speed, the planetary gears 28 of the first planetary gear assembly 16 are not allowed to rotate, therefore the planetary carrier 26 also rotates at the same speed as the sun gear 22 and annulus gear 24. Therefore, the output shaft 54 drives at the same speed as the input shaft 48 in the direct drive mode of operation.

With reference to FIG. 6, the hydraulic control system is shown in a direct gear mode of operation. In particular, the manual valve 84 is in the "D" position and the multiselect solenoid valve 94 and the overdrive solenoid valve 112 are energized. Hydraulic fluid is communicated to the underdrive clutch 46 from passage 100 via passage 108 through underdrive clutch solenoid 106 which is de-energized. Furthermore, hydraulic pressure is communicated to the underdrive clutch 52 through the energized underdrive clutch solenoid 112 via passage 114.

First and direct gear operation as defined above is not altered by a change in manual valve position from "D" to "2" or "L" since hydraulic pressure from passage 86 to passage 100 is maintained.

Figure 7:
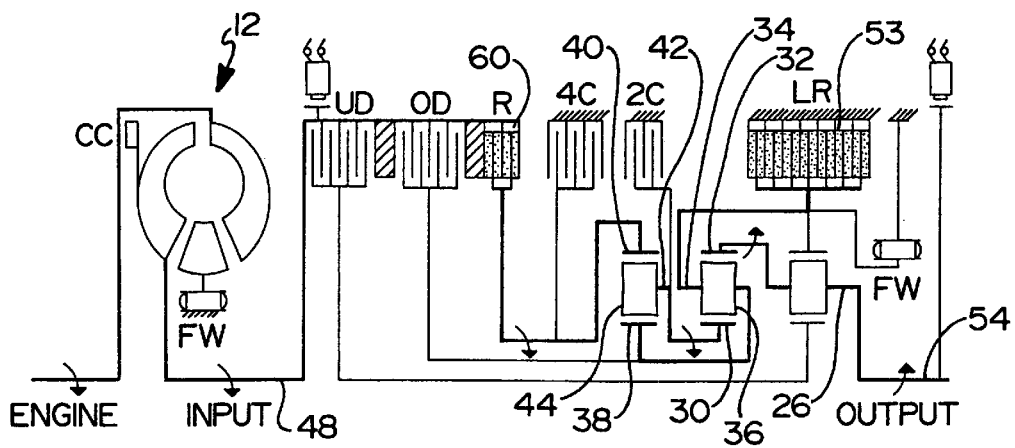
FIG. 7 is a schematic view of the gear train illustrating the torque flow path for reverse gear.

The automatic transmission of the present invention is shown in the reverse drive mode in FIG. 7. In the reverse drive mode, the reverse clutch 60 and low/reverse clutch 53 are each engaged. Thus, torque is delivered from the input shaft 48 to the annulus gear 40 of the third planetary gear assembly 20 via the reverse clutch 60. In addition, the annulus gear 24 of the first planetary gear assembly 16 and the carrier 34 of the second planetary gear assembly 18 as well as the sun gear of the third planetary gear assembly 20 are each prevented from rotating by the engagement of the low/reverse clutch 53. Thus, as the annulus gear 40 of the third planetary gear assembly rotates, the planetary gears 44 of the third planetary gear assembly 20 cause rotation of the carrier 42 which is also connected to the sun gear 30 of the second planetary gear assembly 18. As the sun gear 30 rotates, the planetary gears 36 also rotate since the carrier 34 is fixed, thereby causing rotation of the annulus gear 32 which is connected to the output shaft 54. In the reverse gear, the torque ratio is 3.0 in the opposite direction of rotation of the input shaft.

With reference to FIG. 8, the hydraulic control system is shown in the reverse operating mode wherein the manual valve 84 is in the "R" position. Pressurized fluid is communicated to the reverse clutch 60 through passage 92 and hydraulic fluid is communicated to the low/reverse clutch 53 by passage 96. In order to achieve reverse gear, the multi-select solenoid valve 94 must be de-energized. In the event that a reverse gear shift is detected while the vehicle is moving forward at a speed exceeding a predetermined speed (for example 8 mph), the multi-select solenoid 94 remains energized in order to prevent a reverse shift.

The extreme cold logic shift strategy according to the present invention prevents inadvertent transmission control shutdowns by delaying normal operation until warmer hydraulic fluid conditions are provided. The extreme cold shift logic is employed when the transmission oil temperature is less than −16° F. and the engine coolant temperature is less than 80° F. at the time the engine is started. The extreme cold logic is cleared when the transmission oil temperature exceeds −12° F. Under the extreme cold logic shift strategy, the transmission operation in "D," "2," and "L" is revised to provide first gear operation via the freewheel clutch 55 at low speeds and third gear otherwise. A first gear launch and subsequent shift to third gear at a threshold speed-type strategy is possible because of the freewheel clutch 55. Since the shift between first and third gears only requires the application of the overdrive clutch 52, there is no risk of torque overlap between elements. The freewheel clutch 55 provides first gear reaction torque in combination with the underdrive clutch 46. The underdrive clutch remains engaged during a first gear to third gear shift while the overdrive clutch 52 is engaged in order to provide third gear.

With reference to FIG. 9, the shift logic control flowchart will now be described. Upon vehicle start up at step S1, a timer is started for measuring the time since vehicle start (ts) at step S2. Next, the transmission oil temperature (T oil) and engine coolant temperature ($T_c$) are read at step S3. At step S4, it is determined if the time since start up $t_s$ is less than 60 seconds, the oil temperature $T_{oil}$ is less than –16° and the engine coolant temperature is less than 80°. The 60-second time limit from vehicle start up gives the vehicle controller time to check the rationality of the temperature data. If either of these is determined to be "no," the transmission controller proceeds to step S5 to determine if a normal control operation is set. If a normal control operation is set, control proceeds to the normal control strategy at step S6. If at step S5 it is determined that normal operation is not set, then control proceeds to step S7 where it is determined if the transmission oil temperature $T_{oil}$ is greater than –12° F. If the transmission oil temperature $T_{oil}$ is greater than –12° F., then a normal control operation is set at step S8 and a normal control strategy is resumed at step S6. If the transmission oil temperature $T_{oil}$ is not greater than –12° F., then an extreme cold logic control strategy is implemented and control proceeds to step S9. Similarly, if the oil temperature and engine coolant are each below the predetermined temperatures and the time since vehicle start is less than sixty seconds at step S4, then control continues to step S10 where an extreme cold logic control strategy is set and control then proceeds to step S9. At step S9, it is determined if the shift lever position is in the "R" position. If the shift lever position is in the reverse position, the transmission controller provides instructions to engage reverse gear at step S11. If the shift lever position is not in reverse, it is then determined if the shift lever position was previously in reverse (SLP (i–1)=R) or if the shift lever position is in neutral in step S12. If the shift lever position was previously in reverse, or the shift lever position is neutral as determined in step S12, the transmission provides an instruction at step S13 to engage neutral. If the shift lever position was not previously in reverse and the shift lever is not in neutral as determined at step S12, it is determined at step S14 whether the transmission output speed $N_0$ is less than 900 rpm. If not, the shift logic provides instructions to shift the transmission to third gear at step S15. If in step S14 it is determined that the engine speed is less than 900 rpm, then it is determined in step S16 if the engine speed is less than 600 rpm, or if the shift lever position was previously in neutral (SLP (i–1)=N). If so, the control logic provides instructions to shift to or maintain the transmission in first gear at step S17. The above described extreme cold logic strategy is then repeated until the transmission resumes the normal control strategy at step S6.

The transmission 10 utilizes direct acting solenoid valves to control the shifts. The transmission control is performed in real time, and therefore, under extreme cold conditions the oil and solenoid valves do not respond quickly enough to ensure quality shifts. With prior transmissions in extreme cold conditions, the systems default to a second gear or third gear operation with no shifting permitted. However, third gear launch does not provide an adequate launch feel and a second gear only operation requires only low speed operation. The system of the present invention allows a first gear launch with only a single clutch element needing to be engaged to shift to third gear. Thus, the extreme cold logic of the present invention provides for a smooth launch and a higher speed operation after shifting to third gear during extreme cold conditions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic transmission, comprising:

a planetary geartrain including at least one planetary gearset, said planetary geartrain including a first friction member selectively engagable in combination with an overrunning clutch for obtaining a first gear ratio and a second friction member selectively engagable in combination with said first friction member for obtaining a second gear ratio lower than said first gear ratio, a temperature sensor for sensing a temperature of oil in said automatic transmission;

a transmission controller including extreme cold logic, wherein upon detection of a transmission oil temperature below a predetermined temperature said extreme cold logic is activated wherein said automatic transmission is limited to shifting to the first gear ratio and the second gear ratio wherein said transmission is controlled to operate in said first gear ratio when a vehicle speed is below a predetermined value and said transmission is controlled to operate in said second gear ratio when the vehicle speed exceeds said predetermined value.

* * * * *

UNITED STATES PATENT AND TRADEMARK OFFICE
CERTIFICATE OF CORRECTION

PATENT NO. : 6,024,668
DATED : February 15, 2000
INVENTOR(S) : Gerald L. Holbrook et al.

It is certified that error appears in the above-identified patent and that said Letters Patent is hereby corrected as shown below:

On the Cover Page, Item [75], Inventors:
delete "Danielson" and insert --Danielsen--

Signed and Sealed this

Third Day of April, 2001

Attest:

NICHOLAS P. GODICI

*Attesting Officer*     *Acting Director of the United States Patent and Trademark Office*